(12) United States Patent
Aicher et al.

(10) Patent No.: US 7,139,386 B2
(45) Date of Patent: Nov. 21, 2006

(54) COMMUNICATION SYSTEM AND METHOD FOR CONTROLLING FEATURES IN A COMMUNICATION SYSTEM

(75) Inventors: Helmut Aicher, München (DE); Peter Hierholzer, Wielenbach (DE); Rainer Windecker, Kreuzlingen (CH); Steffi Winkler, Gauting (DE)

(73) Assignee: Siemens Aktiengesellschaft, Munich (DE)

( * ) Notice: Subject to any disclaimer, the term of this patent is extended or adjusted under 35 U.S.C. 154(b) by 152 days.

(21) Appl. No.: 10/381,787

(22) PCT Filed: Sep. 11, 2001

(86) PCT No.: PCT/DE01/03490

§ 371 (c)(1),
(2), (4) Date: Aug. 15, 2003

(87) PCT Pub. No.: WO02/28071

PCT Pub. Date: Apr. 4, 2002

(65) Prior Publication Data

US 2004/0037411 A1   Feb. 26, 2004

(30) Foreign Application Priority Data

Sep. 29, 2000  (DE) .............................. 100 48 349

(51) Int. Cl.
*H04M 7/00* (2006.01)
*H04M 1/56* (2006.01)

(52) U.S. Cl. .................. 379/225; 379/142.15; 379/229

(58) Field of Classification Search ........... 379/142.15, 379/225, 229, 265.02, 265.09
See application file for complete search history.

(56) References Cited

U.S. PATENT DOCUMENTS

| | | | | | |
|---|---|---|---|---|---|
| 5,884,032 A | * | 3/1999 | Bateman et al. | ............ | 709/204 |
| 5,937,051 A | * | 8/1999 | Hurd et al. | ............ | 379/212.01 |
| 6,320,954 B1 | * | 11/2001 | Wille | ............ | 379/225 |
| 6,625,139 B1 | * | 9/2003 | Miloslavsky et al. | ....... | 370/352 |
| 6,882,720 B1 | * | 4/2005 | Booton | ............ | 349/209.01 |

FOREIGN PATENT DOCUMENTS

EP   0 966 145   12/1999

OTHER PUBLICATIONS

Cronin, "An Introduction to TSAPI and Network Telephony", IEEE Comm. Magazine, 1996, pp. 48-54.

* cited by examiner

*Primary Examiner*—Bing Q. Bui
(74) *Attorney, Agent, or Firm*—Staas & Halsey LLP

(57) ABSTRACT

Features available in one communication installation of a communication system are made available system-wide by transmitting an item of feature control information for a subscriber line of a first communication installation to a second communication installation. The item of feature control information is converted into at least one function call, whose associated function is provided by a computer telephony integration (CTI) interface. The function call is transmitted via the CTI interface to the first communication installation. At least one feature control instruction contained in the function call is executed by an administration and maintenance device of the first communication installation. The first communication installation depicts a controlled instance with regard to a feature control, while the second communication installation depicts a controlling instance. This makes it possible to render a feature control existing in the second communication installation usable for the first communication installation.

7 Claims, 2 Drawing Sheets

COMMUNICATION SYSTEM AND METHOD FOR CONTROLLING FEATURES IN A COMMUNICATION SYSTEM

CROSS REFERENCE TO RELATED APPLICATIONS

This application is based on and hereby claims priority to German Application No. 100 48 349.6 filed on Sep. 29, 2000, the contents of which are hereby incorporated by reference.

BACKGROUND OF THE INVENTION

Features are functionalities of communication terminals. There are service-independent features with additional functions, which facilitate and simplify the operation of a communication terminal. Features can also be based on service features. In the case of telephones, open listening, last number redial, handsfree talking, release, transfer, last number redial, automatic callback or call forwarding are examples of such features.

When communication installations are networked within a communication system, the number of features available system-wide has up to now been determined on the one hand by the fact that the features have to be available in the communication installations in question. On the other hand it must be possible to transmit items of feature control information using a system standard signaling protocol. Therefore the number of features available system-wide has up to now been very small compared with the number of features available in one of the communication installations.

SUMMARY OF THE INVENTION

An object of the present invention is therefore to make features in one of the communication installations available system-wide when the communication installations are networked within a communication system.

An important aspect of the invention is that communication installations are networked by a computer telephony integration interface (CTI) for transmitting items of feature control information and function calls. Until now CTI interfaces were only used to link computers and communication terminals or computers and communication installations. With the present invention a first communication installation connected to the CTI interface represents a controlled unit in respect of feature control, while a second communication installation connected to the CTI interface represents a controlling unit. This opens up the possibility of allowing existing feature control in the second communication installation to be used for the first communication installation.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
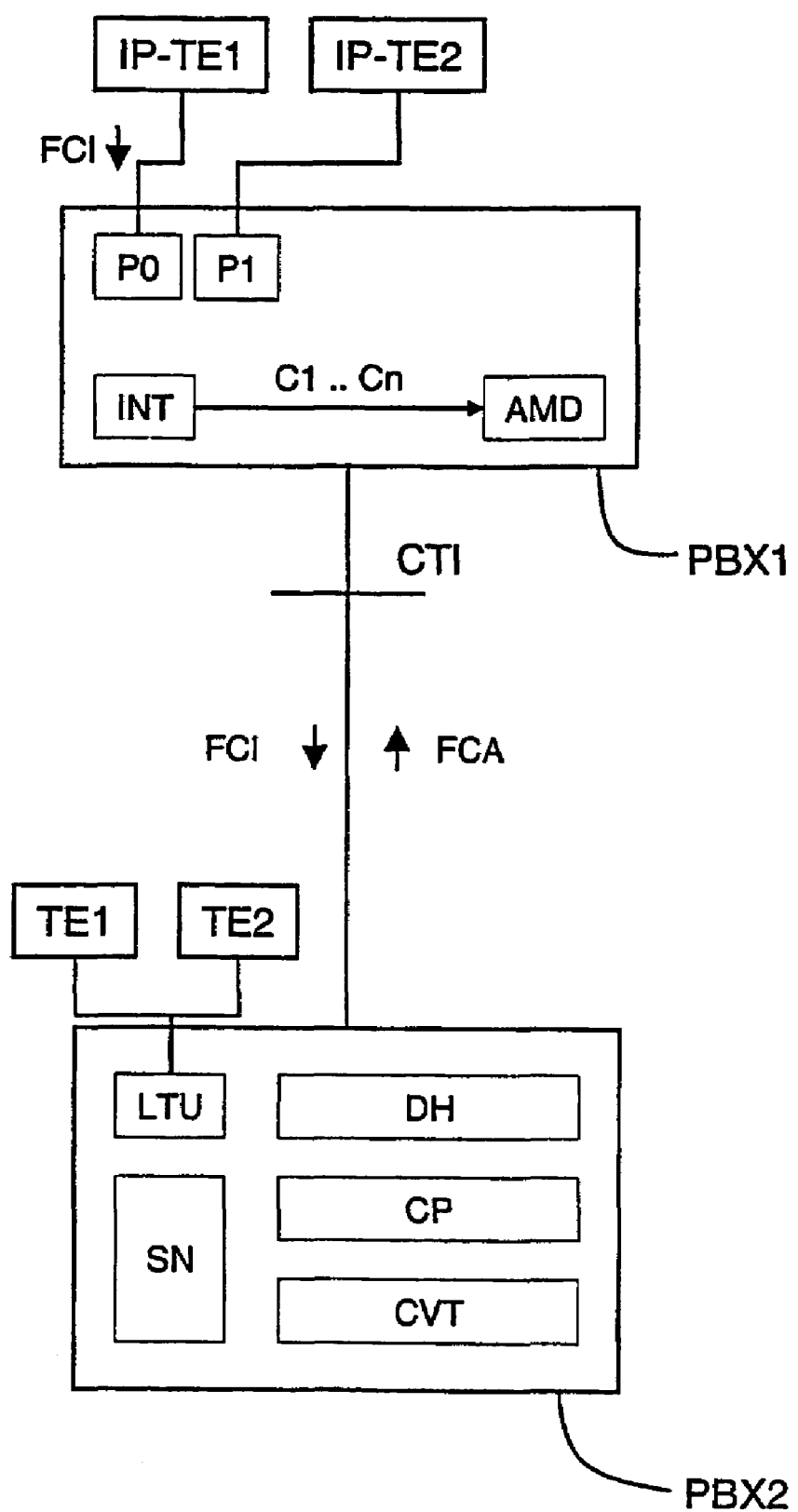
FIG. 1 is a block diagram of a communication system with two communication installations and FIG. 2 is a flow chart for a method for controlling features in a communication system.

Reference will now be made in detail to the preferred embodiments of the present invention, examples of which are illustrated in the accompanying drawings, wherein like reference numerals refer to like elements throughout.

The communication system shown in FIG. 1 has a first communication installation PBX1 and a second communication installation PBX2. The first communication installation PBX1 is a voice-over-internet-protocol communication installation (VoIP). This means that communication links within the first communication installation PBX1 are packet-based. Only a small number of features are available in the first communication installation PBX1. IP (Internet Protocol) telephones IP-TE1, IP-TE2 are connected to the first communication installation PBX1.

The second communication installation PBX2 may be a conventional communication installation. Communication links within the second communication installation PBX2 are connection-based. The second communication installation PBX2 has a switching network SN, a switching control unit CP, a device control unit DH and a peripheral connection unit LTU. Two communication terminals TE1, TE2 are connected to the second communication installation and a large number of features are available for these in the second communication installation.

The first and second communication installations PBX1, PBX2 are connected via a computer telephony integration interface CTI to control and monitor the first communication installation PBX1. The first communication installation PBX1 thereby represents a controlled unit in respect of feature control. The second communication installation PBX on the other hand represents a controlling unit. The switching control unit CP of the second communication installation PBX2 utilizes the functions of an application program controlling the first communication installation PBX1. For the second communication installation PBX2, the first communication installation PBX1 therefore represents a device or group of devices to be controlled via the device control unit DH in respect of feature control.

If a sufficiently large number of CTI interface functions are implemented in the first communication installation PBX1, in particular according to the computer supported telecommunications protocol (CSTA) or a protocol for intelligent networks (IN) recommended by the International Telecommunication Union (ITU) and if feature control instructions of the second communication installation PBX2 are converted or split into CTI interface function calls, the number of features available system-wide corresponds to the number of features available in the second communication installation PBX2. Linking the first and second communication installations PBX1, PBX2 with sophisticated feature control in the second communication installation PBX2 offers the advantage that the associated features are available in the first communication installation PBX1, even if only a few features are initially available there. Apart from implementation of CTI interface functions, no modifications are required to the first communication installation PBX1.

Figure 2:
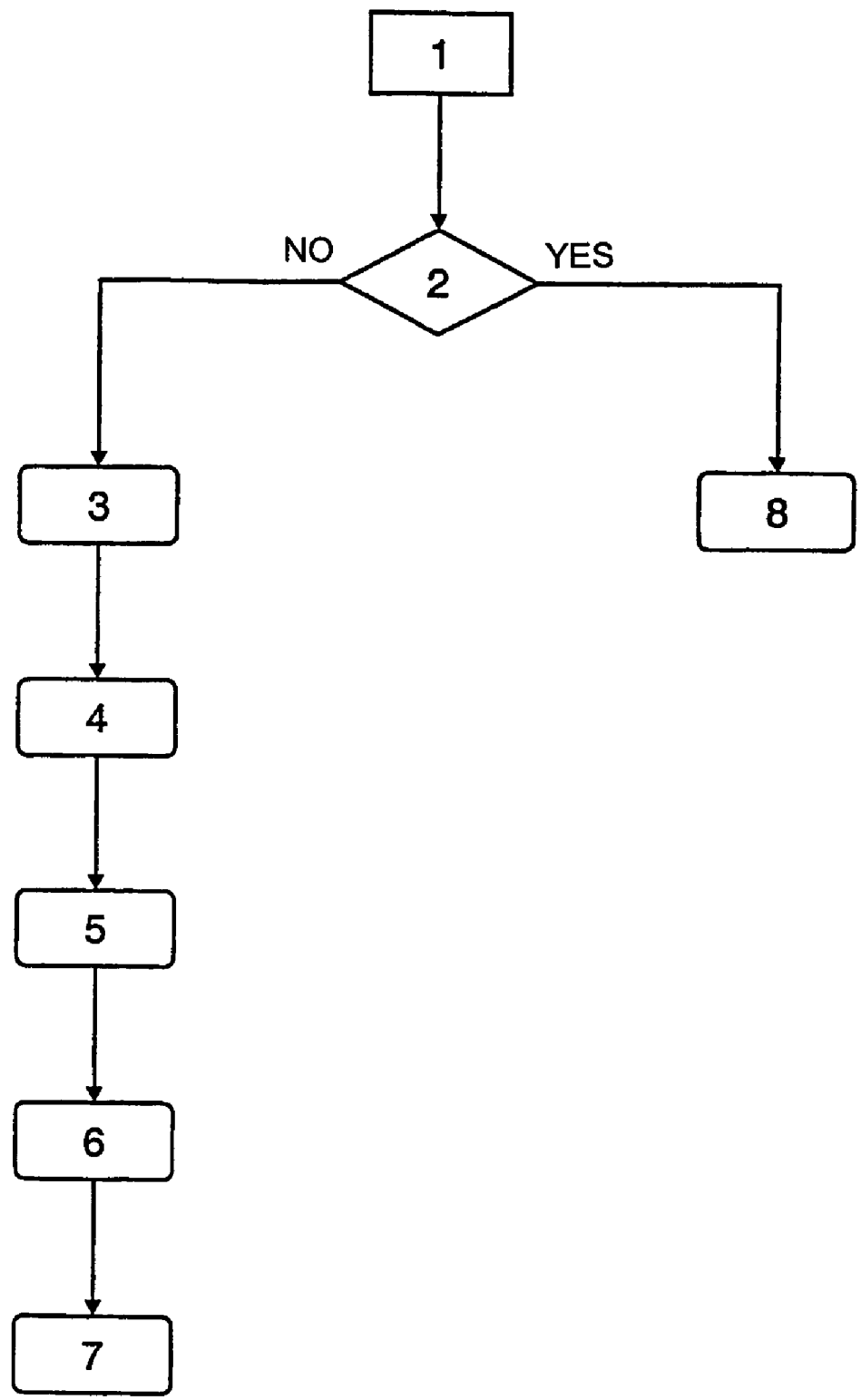

When a feature is controlled for a first subscriber line P0 of the first communication installation PBX1, to which a first IP telephone IP-TE1 is connected, an item of feature control information FCI input for the first subscriber line P0 is transmitted to the first communication installation PBX1. This corresponds to stage 1 of the flow chart shown in FIG. 2. The item of feature control information FCI is for example input at the first IP telephone IP-TE1. It may however also be input for the first subscriber line P0 at a second IP telephone IP-TE2, which is connected to a second subscriber line P1 of the first communication installation PBX1, if there is appropriate authorization for this. The item of feature control information FCI may in the simplest instance contain details of a key depressed at the first IP telephone IP-TE1 for feature control. Alternatively or in addition to this, the item of feature control information FCI may contain details of a feature control instruction. Both details allow simple analysis of the item of feature control information FCI in the first communication installation PBX1.

It is then verified whether a feature control instruction assigned to the item of feature control information FCI can be executed in the first communication installation PBX1 (stage 2). If the feature control instruction can be executed, it is executed by an administration and maintenance device AMD of the first communication installation PBX1 (stage 8). If the feature control instruction cannot be executed in the first communication installation PBX1, the item of feature control information FCI is forwarded to the second communication installation PBX2 (stage 3). The item of feature control information FCI is converted there in a conversion unit CVT into at least one function call FCA, the associated function of which is supplied by the CTI interface CTI (stage 4). Alternatively, the item of feature control information FCI could be converted by the first communication installation PBX1 before the item of feature control information FCI is forwarded to the second communication installation PBX2.

The function call FCA or a function call sequence with a number of function calls FCA is transmitted via the CTI interface to the first communication installation PBX1 (stage 5) and analyzed there in an analysis unit INT in respect of the feature control instructions C1 to Cn contained in the function call FCA or in the function call sequence. Feature control instructions C1 to Cn identified in the analysis unit INT are then transmitted to the administration and maintenance device AMD and executed by this (stage 7).

The CTI interface CTI is used in both directions in the present embodiment. It is used for message and monitoring functions in the direction of the second communication installation PBX2 and for control functions in the direction of the first communication installation PBX1.

If the item of feature control information FCI is assigned more than one feature control instruction, it is verified as in stage 2, which of the feature control instructions can be executed in the first communication installation PBX1. Executable feature control instructions can then be executed there immediately. In the case of non-executable feature control instructions, the item of feature control information FCI is modified to identify the non-executable feature control instructions, forwarded to the second communication installation PBX2 and processed as described above.

Feature control for the second subscriber line P1 takes place in the same way as the feature control disclosed for the first subscriber line P0. Feature control for subscriber lines of the second communication installation PBX2, to which the communication terminals TE1, TE2 are connected, is carried out in the same way as stand-alone operation of the second communication installation PBX2.

The invention is not limited to the embodiment described, in particular not to the linking of a conventional and a VoIP communication installation. Essentially all conceivable combinations of two or more communication installations are possible with different communication terminals connected to these.

The invention has been described in detail with particular reference to preferred embodiments thereof and examples, but it will be understood that variations and modifications can be effected within the spirit and scope of the invention.

The invention claimed is:

1. A method for controlling features in a communication system, comprising:
    transmitting an item of feature control information input for a subscriber line of a first communication installation to a second communication installation;
    converting the item of feature control information into at least one function call, an associated function of which is supplied by a computer telephony integration interface;
    transmitting the at least one function call via the computer telephony integration interface to the first communication installation; and
    executing at least one feature control instruction contained in the at least one function call by an administration and maintenance device of the first communication installation.

2. A method according to claim 1, wherein said converting of the item of feature control information into the at least one function call is performed by one of the first communication installation and the second communication installation.

3. A method according to claim 2,
    further comprising determining executability by the first communication installation of the at least one feature control instruction assigned to the item of feature control information, and
    wherein said transmitting of the item of feature control information from the first communication installation to the second communication installation and said converting are performed only if it is determined that the at least one feature control instruction assigned to the item of feature control information is not executable by the first communication installation.

4. A method according to claim 3, wherein said executing of the at least one feature control instruction is performed when said determining determines that the at least one feature control instruction is executable by the administration and maintenance device of the first communication installation.

5. A method according to claim 4, wherein the associated function is implemented according to a computer supported telecommunications application protocol.

6. A method according to claim 5, wherein the associated function is implemented according to a protocol for intelligent networks recommended by the International Telecommunications Union.

7. A method according to claim 6, wherein communication links within the first communication installation are packet-based and communication links within the second communication installation are connection-based.

* * * * *